Nov. 22, 1966 W. L. SPRAGUE 3,287,626

PHASE SHIFTING NETWORKS

Filed March 28, 1962

INVENTOR.
William L. Sprague
BY
Hugh L. Fisher
ATTORNEY

United States Patent Office 3,287,626
Patented Nov. 22, 1966

3,287,626
PHASE SHIFTING NETWORKS

William L. Sprague, Royal Oak, Mich., assignor to General Motors Corporation, Detroit, Mich., a corporation of Delaware Filed Mar. 28, 1962, Ser. No. 183,270
6 Claims. (Cl. 323—122)

This invention relates to improvements in phase shifters.

Very often it is necessary to shift the phase of an alternating signal in accordance with variations in a control signal. If this phase shifting is to be done by adjusting either resistive or reactive circuit elements, an efficient mode of translating the variations of the control signal into corresponding adjustments of the circuit elements is mandatory. In the past, adjustments have been made mechanically, electrically, and electronically. A mechanical adjuster limits the use of the phase shifter to low frequency applications because of the inability of the mechanical arrangement to respond to the more rapid phase shifting rates required with the higher frequencies. Electrical and electronic adjusters are more responsive but they tend to distort the phase shifted output signal by varying the amplitude, producing non-linearity, or introducing extraneous voltages into the output.

Accordingly, the invention contemplates a novel phase shifter that operates at high rates to shift the phase of an alternating signal in accordance with variations in a control signal and with minimum distortion of the phase shifted output. More specifically, the invention provides a mode of adjusting circuit elements of the phase shifter electronically in accordance with a varying control signal so as to achieve rapid and accurate phase shifting over a substantial range.

The invention further contemplates a phase shifter employing a pair of unidirectional conducting devices as a variable resistance and to control the forward resistance of the devices in accordance with variations in a control signal and without introducing significant non-linearity or extraneous voltages in the phase shifted output.

Figure 1:
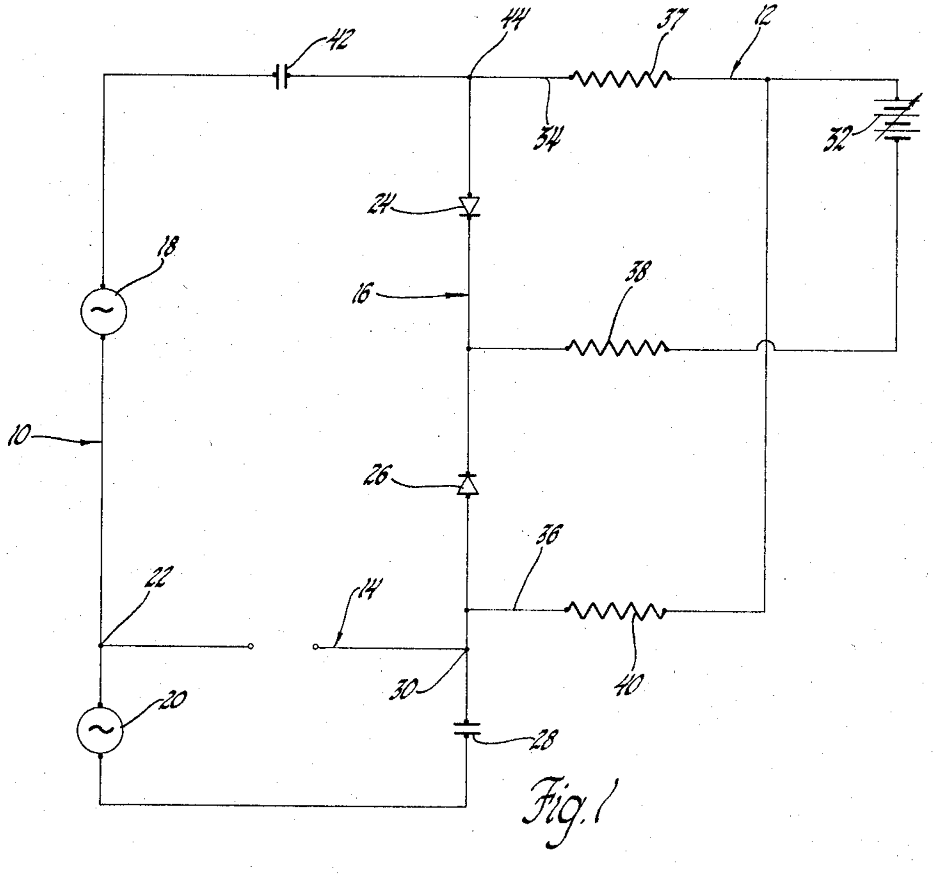
Figure 2:
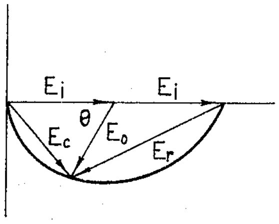

The foregoing and other objects and advantages of the invention will become apparent from the following description and from the accompanying drawings in which:

FIGURE 1 is a diagram of a phase shifter circuit incorporating the principles of the invention; and FIGURE 2 is a vector diagram portraying the relationship between the different voltages utilized in the FIGURE 1 circuit.

Describing now the figures in detail and referring first to FIGURE 1, the numerals 10, 12, and 14 designate, respectively, input, control, and output circuits and the numeral 16 denotes generally the phase shifting network. As will be explained more in detail, an alternating input signal of some predetermined frequency supplied by the input circuit 10 is converted by the phase shifting network 16 into a phase shifted output signal of the same frequency and transferred to the output circuit 14. The amount of phase shift is determined by the control circuit 12.

The input circuit 10 employs two A.C. generators 18 and 20 that are serially connected and that have a common junction 22 therebetween. The generators 18 and 20 develop an alternating voltage of any desired frequency, e.g., frequencies within the RF range or higher. If preferred, the generators 18 and 20 may be replaced by a center-tapped transformer or either a resistive or a reactive voltage divider, as will be understood by those versed in the art. The main considerations in selecting the type of alternating voltage sources is that the two voltages should be in phase, of the same frequency and polarity, and preferably have the same magnitude. The reasons for this will become apparent in the operational summary.

The phase shifting network 16 for the input signal includes a pair of unidirectional conducting devices as diodes 24 and 26, which form the resistive portion, and a capacitor 28, which affords the reactance. If wanted, an inductor may be employed in place of the capacitor 28. The diodes 24 and 26 are, as depicted, connected in series opposition relative to each other and in series with the generators 18 and 20. The diodes 24 and 26 should also be well matched so that the effect of their non-linearities will be cancelled in a way to be described.

The output circuit 14 is connected across the common junction 22 between the generators 18 and 20 and a common junction 30 between the diodes 24 and 26 and the capacitor 28. By connecting the output circuit 14 in this way, a full 180° phase shifting range is approachable. Phase shifts greater than 180° can be obtained by connecting in cascade two phase shifting networks, i.e., connecting the input circuit of another phase shifting network to the output circuit 14.

Considering now the control circuit 12, a variable control signal voltage source denoted generally at 32 provides a variable control signal to two branches 34 and 36, which, with the source 32, comprise the circuit 12. The source 32 may provide either a D.C. voltage or an A.C. voltage of a frequency that is low relative to the input signal frequency.

To describe the current flow in the branches 34 and 36, the conventional positive to negative direction of flow will be presumed. Hence, the current flow in the branch 34 will be from the source 32 through a resistor 37, the diode 24, a resistor 38, and back to the source 32. Current flow in the branch 36 will be from the source 32 through a resistor 40, the diode 26, the resistor 38, and to the source 32. The amount of current flow in the branches 34 and 36, of course, will be established by the setting of the control signal source 32 but will preferably maintain the diodes 24 and 26 conductive and cause them to always operate in the range in which the dynamic forward resistance of the diodes 24 and 26 varies substantially linearly with the quantity of current flow. By having the diodes 24 and 26 well matched and operating always in their linear operating range, any resistance change of the diodes 24 and 26 by the alternating input signal is in effect cancelled. This feature will be explained further in the following operational summary.

The alternating input signal from the input circuit 10 is isolated from the source 32 due to the comparatively high resistance of the resistors 37, 38, and 40. On the other hand, the control signal is segregated from the input circuit 10 by a blocking capacitor 42.

To understand the operation, the foregoing explanation of the control circuit 12 should be kept in mind while assuming that the input signal from the input circuit 10 is at point 44 going positive. This positive going input signal will increase the current flow through the diode 24, thereby in effect decreasing the resistance of diode 24 proportionately. As has been mentioned, the diodes 24 and 26, with the current flows involved, operate within their linear operating range so that resistances of the diodes are substantially inversely proportional to the amount of current flow. The positive going input signal, while increasing current flow through the diode 24, simultaneously causes the current flow through the diode 26 to be reduced by the same amount. When the input signal at point 44 is going negative, the opposite takes place, namely, the conduction of the diode 24 decreases and the conduction of the diode 26 increases by the same amount. Consequently, the anode to anode resistance of the diodes 24 and 26 does not change as the alternating input signal varies. This anode to anode resistance is only changed by varying the control voltage from the source 32. To the alternating input signal the two diodes 24 and 26 merely appear as a variable resistance. Therefore, the output signal transferred to the output circuit 14 will be shifted in phase relative to the input signal an amount determined solely by the magnitude of the control voltage. Moreover, the phase and waveform of the output signal is entirely uninfluenced by the magnitude of the alternating input signal within the normal operating range.

The different voltages involved in phase shifting the output signal relative to the input signal over the permitted range of 180°, are illustrated in the FIGURE 2 vector diagram. In this diagram, the $E_i$'s represent the voltages from the generators 18 and 20. The algebraic sum of the $E_i$ voltages is equivalent to the input signal voltage. $E_c$ is the voltage across the capacitor 28, and $E_r$, the voltage across the diodes 24 and 26. $E_o$ represents the output signal voltage transferred to the output circuit 14. Since the output circuit 14 is connected to the common junction 22, the $E_o$ arrow has its pivotal point at the junction of the two equal $E_i$ voltages and assumes some phase angle $\theta$ with respect to the $E_i$ voltages as determined by the magnitude of the $E_r$ voltage. Hence, as the magnitude of the $E_r$ voltage is altered by the control signal voltage, the phase angle $\theta$ will change corresponding amounts within the permitted 180° range. It should be noted that the magnitude $E_o$ voltage remains constant over the entire 180° phase shift range as long as the $E_i$ voltages are equal. By employing two alternating voltages of equal magnitude, of the same frequency, and of the same phase and polarity as are obtained from the two serially connected generators 18 and 20, and by connecting the output circuit 14 at the common junction 22 therebetween, the 180° phase shift of the always constant magnitude output voltage $E_o$ is possible merely by varying $E_r$ with the control circuit 14. Of course, if $E_o$ need not be constant, the two $E_i$ voltages can be of different magnitudes.

From the foregoing, it will be appreciated that an alternating input signal is converted by the control circuit 12 to a phase shifted output signal of the same frequency only in accordance with variations in the signal voltage. The influence of the alternating input signal is cancelled because of the series opposed relationship of the diodes 24 and 26, and because the diodes 24 and 26 are caused to operate in their linear range. Hence, the output signal will not be distorted by the alternations of the input signal. By having the diodes 24 and 26 in parallel with respect to the control signal voltage source 32, variations in the control signal will not appear as voltage components of the output signal. Additionally, as indicated in the FIGURE 2 vector diagram, the amplitude of the output signal will not be changed as the dynamic resistance of the diodes 24 and 26 is varied. Therefore, the output signal will not be distorted and will always be proportional to the input signal.

The invention is to be limited only by the following claims.

I claim:

1. A network converting an input signal of a predetermined frequency to a phase shifted output signal of the same frequency comprising a pair of serially connected voltage sources having a common junction therebetween and arranged so as to provide the input signal, a phase shifter including serially connected resistive and reactive means arranged in series with the voltage sources and also having a common junction therebetween, the resistive means including a pair of unidirectional conducting devices of similar characteristics, and means applying a control signal of a frequency that is substantially less than the input signal frequency to the devices so as to vary the resistance thereof, the devices being arranged in series opposed relation so as to substantially eliminate the influence of the alternations of the input signal on the resistance of the devices and thereby develop at the common junctions an output signal that is phase shifted relative to the input signal in accordance with the magnitude of the control signal.

2. A network converting an input signal of a predetermined frequency to a phase shifted output signal of the same frequency comprising a pair of serially connected voltage sources having a common junction therebetween and arranged so as to provide the input signal, a phase shifter including serially connected resistive and reactive means arranged in series with the voltage sources and also having a common junction therebetween, the resistive means including a pair of unidirectional conducting devices of similar characteristics, means applying a control signal of a frequency that is substantially less than the input signal frequency to the devices so as to vary the resistance thereof, the devices being arranged in series opposed relation so as to substantially eliminate the influence of the alternations of the input signal on the resistance of the devices and thereby develop at the common junctions an output signal that is phase shifted relative to the input signal in accordance with the magnitude of the control signal, and means isolating the control signal from the input signal.

3. A network for converting an input signal of a predetermined frequency to a phase shifted output signal comprising a pair of equal magnitude and serially connected alternating voltage sources having a common junction and providing the input signal, a phase shifting network for converting the input signal to a phase shifted output signal of the same predetermined frequency, the phase shifting network having resistive and reactive means provided with a common junction and connected in series with the voltage sources, the resistive means including a pair of unidirectional conducting devices of similar characteristics and having an operating range in which the resistance thereof varies substantially linearly with the quantity of current flow therethrough, and means applying a control signal to the unidirectional conducting devices for rendering the devices conductive in the linear operating range thereof and for varying the resistance of the devices, the devices being in series opposed relation so as to substantially eliminate the influence of the alternations of the input signal on the resistance of the devices and thereby develop at the common junctions an undistorted output signal that is phase shifted over a 180° range in accordance with the magnitude of the control signal.

4. In combination; an input circuit including plural sources of signal energy arranged so as to have a common junction and to develop an input signal of a predetermined frequency; a phase shifting network for converting the input signal to a phase shifted output signal of the same predetermined frequency, the phase shifting network comprising serially connected variable resistive means and reactive means having a common junction, the variable resistive means including a pair of unidirectional conducting devices of similar characteristics and having a range of conduction in which the resistance thereof varies substantially linearly with the quantity of current flow therethrough, means applying a variable control signal to the devices for altering the conduction thereof within the linear range of operation and thereby alter the forward resistance of the devices, the devices being in series opposed relation so as to substantially eliminate the influence of the alternations of the input signal on the forward resistance of the devices; and an output circuit connected across the common junctions of the plural sources of signal energy and the variable resistive and reactive means so as to have applied thereto an undistorted output signal that is shifted relative to the input signal in accordance with the magnitude of the control signal.

5. In combination, an input circuit including plural sources of signal energy arranged so as to have a common junction and to develop an input signal of a predetermined frequency, a phase shifting network for converting the input signal to a phase shifted output signal of the same predetermined frequency, the phase shifting network comprising serially connected variable resistive means and reactive means having a common junction, the variable resistive means including a pair of unidirectional conducting devices of similar characteristics and having a range of operation in which the resistance varies substantially linearly with the quantity of current flow therethrough, a control circuit including an energy source for supplying to the devices a variable control signal of a frequency less than the frequency of the input signal for altering the conduction of the devices within their linear range of operation and thereby vary resistance of the devices, the devices being in series opposed relation relative to the input circuit sources of signal energy so as to substantially eliminate the influence of the alternations of the input signal on the resistance of the devices and in parallel relation with respect to the control circuit energy source, means isolating the input signal from the control circuit, and means isolating the control signal from the input circuit; and an output circuit connected across the common junctions between the plural sources of signal energy and between the variable resistive means and the reactive means so as to have applied thereto an undistorted output signal shifted in phase over a 180° range relative to the input signal and in accordance with the magnitude of the control signal.

6. In combination; an input circuit having plural sources of alternating signal energy arranged so as to have a common junction and to develop an input signal of a predetermined frequency; a phase shifting network for converting the input signal to a phase shifted output signal of similar frequency, the phase shifting network including a pair of diodes and a reactive element, the diodes and the reactive element being in series connection with the input circuit sources of signal energy so as to have a common junction therebetween, the diodes having similar characteristics including a range of operation in which the resistance thereof varies substantially linearly with the quantity of current flow therethrough, a control circuit including an energy source for providing a variable control signal of a frequency less than the predetermined frequency of the input signal, the control circuit energy source being connected across each diode so that the diodes are each in parallel with the control circuit energy source, the control signal altering the conduction of the diodes within their linear range of operation so as to vary the forward resistance thereof, the diodes being in series opposed relation so as to substantially eliminate the influence of the alternations of the input signal on the resistance of the diodes, resistance means isolating the input signal from the control circuit, and capacitance means for isolating the control signal from the input circuit; and an output circuit connected across the common junction between the plural sources of signal energy and between the pair of diodes and the reactive element so as to have applied thereto an output signal that is undistorted relative to the input signal and that is shifted in phase over a 180° phase shifting range in accordance with the magnitude of the control signal.

References Cited by the Examiner

UNITED STATES PATENTS

| | | | |
|---|---|---|---|
| 2,164,344 | 7/1939 | Norwine | 333—14 |
| 2,293,628 | 8/1942 | Reiling | 333—14 |
| 2,753,519 | 7/1956 | Fischman | 323—122 |
| 2,794,948 | 6/1957 | Thompson et al. | 323—122 |
| 2,825,764 | 3/1958 | Edwards | 333—14 |
| 2,920,291 | 1/1960 | Brundage | 333—14 |
| 2,984,799 | 5/1961 | Gerks | 333—29 |
| 3,037,129 | 5/1962 | Le Bel | 307—88.5 |

HERMAN KARL SAALBACH, *Primary Examiner.*

C. BARAFF, E. LIEBERMAN, *Assistant Examiners.*